United States Patent [19]

Courtois

[11] Patent Number: 5,038,346

[45] Date of Patent: Aug. 6, 1991

[54] METHOD AND SYSTEM FOR TRANSMITTING DATA PACKETS BUFFERED IN A DISTRIBUTED QUEUE ON A COMMUNICATION NETWORK

[75] Inventor: Pierre-Jacques F. H. Courtois, Brussels, Belgium

[73] Assignee: U.S. Philips Corporation, New York, N.Y.

[21] Appl. No.: 433,637

[22] Filed: Nov. 8, 1989

[30] Foreign Application Priority Data

Nov. 22, 1988 [NL] Netherlands ................ 8802884

[51] Int. Cl.$^5$ .................. H04J 3/24; H04L 12/28
[52] U.S. Cl. .................. 370/94.100; 370/85.100; 370/85.900; 370/85.600; 340/825.500
[58] Field of Search ............ 370/94.1, 85.2, 85.6, 370/85.15, 85.11, 85.1, 85.9, 85.12; 340/825.5

[56] References Cited

U.S. PATENT DOCUMENTS

| 4,320,502 | 3/1982 | DeVeer | 370/85.11 X |
| 4,532,626 | 7/1985 | Flores et al. | 370/85.9 |
| 4,542,502 | 9/1985 | Levinson et al. | 370/85.15 X |
| 4,560,985 | 12/1985 | Strecker et al. | 370/85.6 X |
| 4,569,044 | 2/1986 | Tao et al. | 370/85.2 |
| 4,581,735 | 4/1986 | Flamm et al. | 370/85.2 |
| 4,774,707 | 9/1988 | Raychaudhuri | 370/85.2 |
| 4,817,088 | 3/1989 | Adams | 370/85.7 X |
| 4,864,576 | 9/1989 | Mark | 370/85.15 X |
| 4,926,418 | 5/1990 | Cidon et al. | 370/85.15 X |

FOREIGN PATENT DOCUMENTS 8603639  6/1986  PCT Int'l Appl. .

Primary Examiner—Douglas W. Olms
Assistant Examiner—H. Kizou
Attorney, Agent, or Firm—Anne E. Barschall

[57] ABSTRACT

A method and apparatus for a time division multiplex transmission of data packets from a plurality of access units in a communications network having a pair of oppositely directed unidirectional buses between which the access units are coupled, each access unit transmitting its data packets in empty time slots on a first of such buses. A queue is formed in each access unit of the data packets therein, and each time a further data packet is added to such queue a request flag is transmitted on the second bus. A count is kept of the number of request flags passing the access unit on the second bus, and such further data packet is assigned a priority value corresponding to the number of request flags existing at the time the further data packet is added to the queue. A distributed queue is thereby formed of all data packets in the network, a given data packet being transmitted in the first empty time slot on the first bus after a preselected number of free slots therein have passed its access unit, such preselected number being equal to the priority value of such data packet. Transmission is thereby achieved strictly in accordance with the first-in/first-out principle, so that the waiting period for a given data packet is not affected by the presence of subsequent data packets in other access units even though certain such subsequent data packets may already have reached the head of the queues in their access units.

7 Claims, 4 Drawing Sheets

METHOD AND SYSTEM FOR TRANSMITTING DATA PACKETS BUFFERED IN A DISTRIBUTED QUEUE ON A COMMUNICATION NETWORK

BACKGROUND OF THE INVENTION

1. Field of the Invention

The invention relates to a method and system for transmitting data packets in time slots on a communication network having first and second unidirectional buses which are oppositely directed and a plurality of access units coupled between the buses, said method including the steps of forming a distributed queue of data packets by queueing in each access unit the therein received data packets to be transmitted on the first unidirectional bus, transmitting a request flag on the second unidirectional bus by each access unit for each data packet in the queue in the respective access unit, keeping track in each access unit of all request flags passing said access unit on the second unidirectional bus, and transmitting a data packet from the queue in an access unit if a predetermined number of empty time slots has passed said access unit on the first bus.

2. Description of the Related Art

A method of this type is described in International Patent Publication No. WO 86/036239 Published June 19, 1986. According to this prior art method a request flag for a data packet is transmitted on the second bus by an access unit upon arrival of said data packet at the head of the queue in the access unit. Simultaneously the momentary request counter value is loaded in a countdown counter, whereafter the request counter is resetted. Thereafter the request counter starts accumulating again the number of request flags passing on the second bus, whereas the access unit for each empty time slot detected on the first bus generates a decrement signal to the countdown counter. The first empty time slot detected by the access unit after the countdown counter has reached a predetermined end value (zero) is used by the access unit to transmit the data packet on the first bus. If the queue in the access unit comprises at least one more data packet to be transmitted, the new momentaneous request counter value is loaded into the countdown counter and the whole procedure is repeated until the last data packet in the queue is transmitted. If there are no more data packets in the queue the request counter still accumulates the passing request flags, transmitted by downstream access units, but is simultaneously decremented by each empty time slot passing on the first bus in downstream direction. Therewith the access unit keeps track of all still pending and not answered request flags transmitted by downstream access units.

According to this method each data packet first has to travel through the queue in an access unit. As it reaches the head of the queue the data packet has to wait further for the passing of a number of empty time slots requested by downstream access units before it can be transmitted. No consideration is given to the length of the queue in any given access unit. That implies that the period between the time of arrival of a data packet in an access unit and the time said data packet is actually transmitted will be significantly shorter for an access unit with comparatively low traffic than for an access unit with comparatively busy traffic. It is furthermore found in practice that the waiting period for data packets arriving in an access unit at a relatively short distance from the time slot generator is an average significantly shorter than the waiting time for data packets arriving at an access unit more distant from the time slot generator.

The significant variations in the waiting period for a data packet between the time of its arrival in an access unit and the time of transmission, depending on the traffic density in the respective access unit, and the physical position of this access unit may cause problems. Moreover, in many applications, it is desirable to minimize "jitter", i.e. the difference in waiting time of two successive packets arriving at the same access unit. Therefore, in many cases it is considered an advantage for systems of this type if the method would operate in accordance with the "first-in/first-out" priniciple. Maintaining a strict first-in/first-out principle would assure that the waiting time for each data packet is not dependent on the physical location of the access unit to which it is supplied, and is only dependent on the traffic density of the system as a whole. If the density increases then also the waiting time for each packet will increase proportionally. Moreover, the strict first-in/first out principle is also a strategy which minimizes the jitter mentioned above.

SUMMARY OF THE INVENTION

The Principal object of the invention is to provide a method and system of the type mentioned in the first paragraph such that the first-in/first-out principle is strictly maintained.

In agreement with that object the method of transmitting data packets in time slots on a communications network of the type mentioned in the first paragraph is characterized in that at the time a further data packet arrives in an access unit and is added to the queue therein, a request flag is transmitted on the second bus by said access unit and that said further data packet is transmitted by the access unit in the first empty time slot on the first bus after a preselected number of free slots on the first bus have passed said access unit, such preselected number of free slots being equal to the total number of data packets in the distributed queue at the time of arrival of the further data packet in said access unit. Consequently, only prior data packets are transmitted before the further data packet (first-in/first-out principle).

By transmitting a request flag for a further data packet at the time said further data packet is added to the queue in an access unit all the data packets which were already in a queue in any of the access units have a higher priority in relation to this further data packet. However, all data packets arriving at any access unit after such further data packet have a lower priority. In other words, the first-in/first-out principle is strictly maintained in the network.

In order to keep track of each further data packet in the total number of data packets already in the distributed queue at the time of arrival of said further data packet, it is necessary to add to the further data packet, at an time, it arrives in the access unit and is added to the queue therein, a priority value equal to the number of request flags detected by said access unit since the arrival therein of the last data packet preceding said further data packet.

The invention not only relates to a method of transmitting data packets but also relates to a system for carrying out such a method. A system in accordance with the invention is adapted for transmitting data packets in time slots on a communication network having first and second unidirectional buses which are oppositely directed and a plurality of access units coupled between the buses. Such system includes in each access unit a request flag counter connected to become incremented by each request flag passing on the second bus; a countdown counter connected to become decremented from an initially loaded value to a predetermined end value by each empty time slot passing on the first bus; a queue buffer for queueing the data packets received in the access unit for transmission on the first bus; and a logic interface designed to transmit request flags for each data packet in the queue buffer and to initiate transmission of the data packet at the head of the queue after the countdown counter reaches said predetermined end value. The logic interface also reloads the countdown counter on the basis of the value, accumulated in the request flag counter. The system is characterized in that the queue buffer is disigned so that in combination with each data packet a priority value can be stored and shifted through said buffer, and the logic interface is designed to transmit a request flag on the second bus at the time a further data packet arrives in the access unit, to store said further data packet in the queue buffer in combination with the current accumulated value in the request counter, to reset said request counter thereafter, and to reload the request countdown counter with the value added to a data packet in the queue buffer as soon as said last mentioned data packet reaches the head of the queue buffer in the access unit.

BRIEF DESCRIPTION OF THE DRAWING

The invention will now be described in more detail with reference to the attached drawings, wherein.

DESCRIPTION OF THE PREFERRED EMBODIMENT

Figure 1:
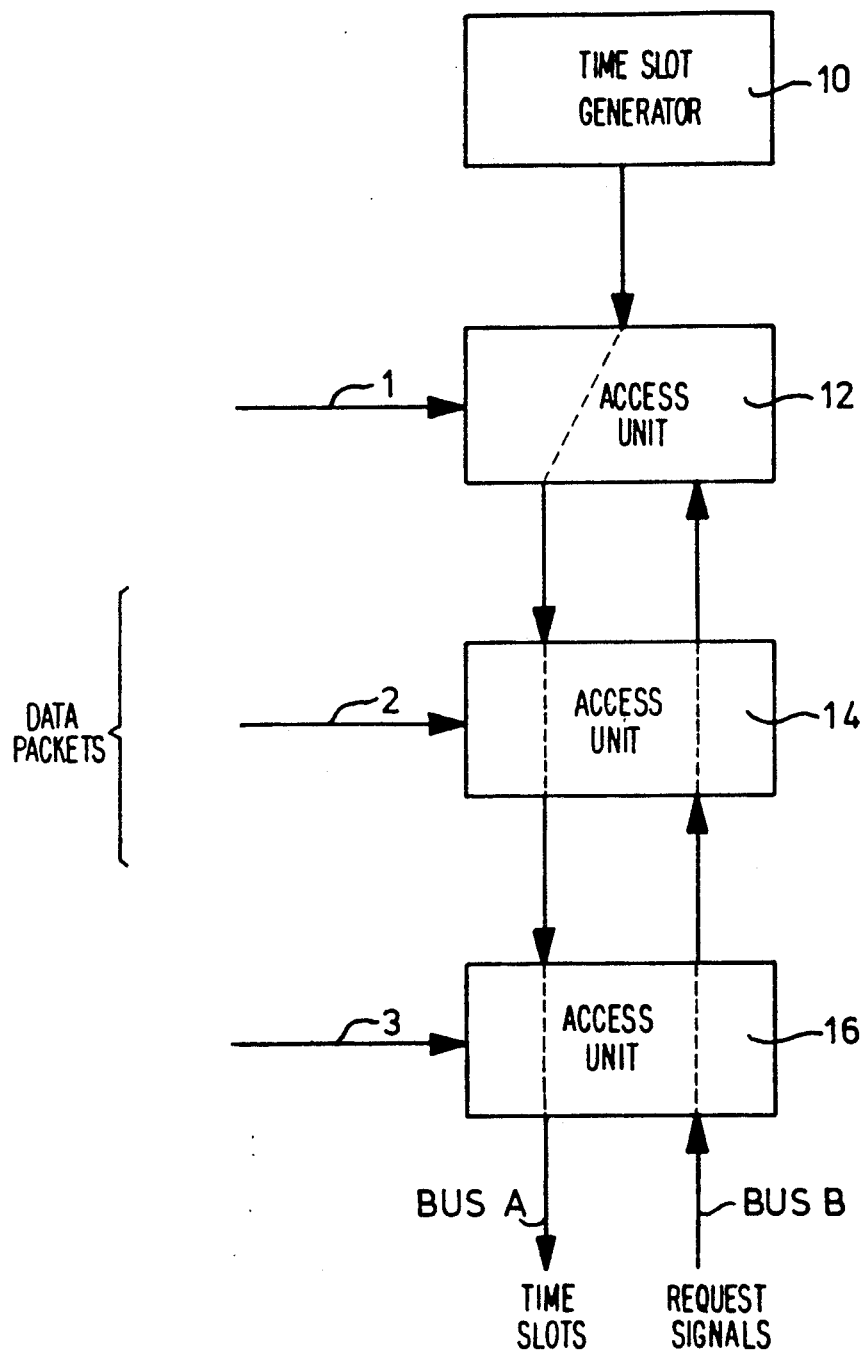
FIG. 1 illustrates schematically a communications network in which the invention can be applied.

FIG. 1 illustrates a known form of communications network, comprising a number of input links indicated by 1, 2 and 3 each connected to an access units 12, 14, 16 respectively. The access units are connected to two unidirectional busses A and B which are oppositely directed. One end of the bus A is connected to a time slot generator 10 defining a continuous succession of time slots on the bus A. Data packets with a predetermined format, adapted to the time slot dimensioning used in the system, can be supplied to one of the input links 1, 2 and 3 and can be further transported on bus A in one of those time slots in a way which will be explained further with reference to the following figures. The bus B is used for sending request signals from downstream access units to upstream access units to indicate to those lastmentioned units that a downstream access unit is waiting for a free time slot to insert a data packet therein.

Figure 2:
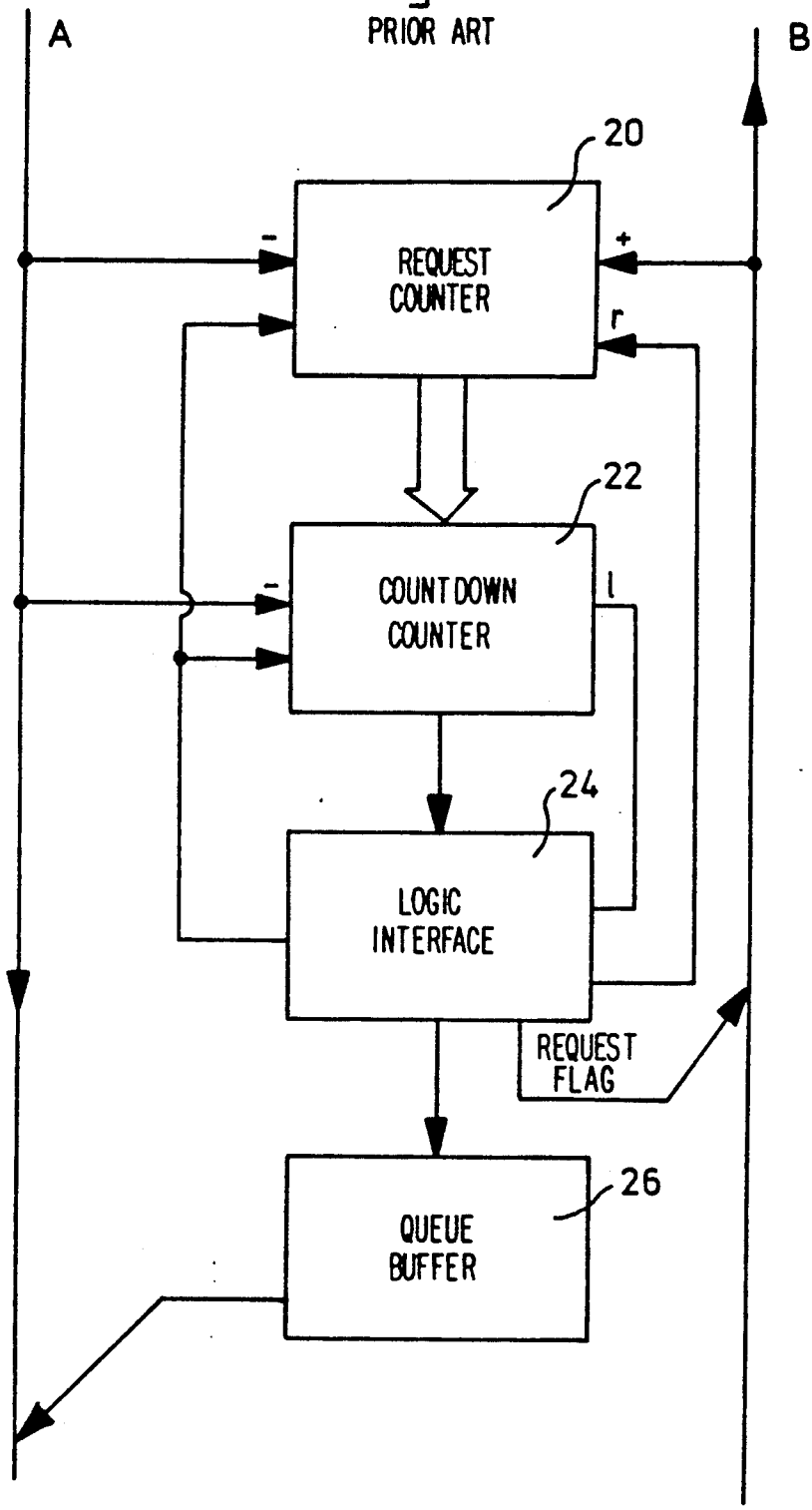
FIG. 2 illustrates schematically one of the access units in the network according to FIG. 1, functioning in accordance with the abovementioned prior art method.

With reference to FIG. 2, first a short, explanation will be provided of the functioning of the prior art method which is described in detail in the above referenced International Patent Application WO 86/03639.

In FIG. 2 only some of the hardware components within one of the access units are illustrated, just those components being necessary to explain the functioning of this access unit in more detail.

As shown in FIG. 2 the access unit comprises a request counter 20, a countdown counter 22 and an access unit logic interface 24 connected in the illustrated way between the two busses A and B. The bus A is used to transport data packets in predetermined time slots in a downwards direction whereas bus B is used to transport request signals in an upwards direction. Data packets are supplied by not illustrated means to the access unit logic interface 24.

The received data packets are queued up by the logic interface 24 in the queue buffer 26 in the order in which they are received in the access unit. Thereafter the access unit will try to transmit these data packets in the queue one after the other in the following manner. Each time a data packet reaches the head of the queue the logic interface 24 will send a request upwards on bus B to all other access units positioned upstream. In each of those upstream access units this request is received and used to increment the request counter 20. Under control of the time slot generator 10 a continuous succession of time slots is transmitted on bus A and each time an empty slot is passing an access unit the request counter 20 therein is decremented. By decrementing the counter it is recognized that the passing empty slot will serve one of the downstream access units which is waiting to transmit a data packet. It is therefore clear that the current value in the request counter 20 indicates the number of requests originating from downstream access units which are waiting for an empty time slot passing on the bus A. After letting pass a corresponding number of empty time slots on the bus A it is the turn of the access unit under consideration to transmit the data packet at the head of that unit's queue. For that purpose the current value in the request counter 20 is loaded into the countdown counter 22 under control of a signal from the access unit logic interface 24 simultaneous with a transmission of the request signal. Thereafter the request counter is reset to zero and starts accumlating request flags again. The countdown counter will be decremented for each empty slot passing on the bus A and the request counter 20 will be incremented for each request passing upwards on bus B. During the period the countdown counter continues to be in action the request counter is incremented. When the countdown counter reaches zero, the access unit logic interface 24 may access the downstream bus A and grab the next empty slot to transmit the data packet from the head position of the queue buffer 26. If thereafter the access unit has another data packet to send the above procedure is repeated using the then current value in the request counter 20.

As already explained above, this prior art method of handling the input data packets supplied through a number of input links to a transmission bus has a number of disadvantages. A first disadvantage is that the delay between the arrival of a data packet in the access unit and the actual transmission thereof on bus A, shows a significant variation per individual input link depending on the relative queue lengths at the different access units, i.e. depending on the relative time needed for data packets at the different access units to reach the head of the queues. Furthermore, the delays incurred by two successive data packet arriving at a same access unit (jitter) will also show significant variation between themselves depending on the number of requests generated by downstream access units between the two time instants at which these data packets arrive at the head of the queue.

In many cases it will therefore be preferable to maintain a strict "first-in/first-out" protocol, which avoids the disadvantages mentioned above. The present invention provides a way whereby a strict FIFO strategy can be implemented such that data packets will be transmitted on the output bus in the order of their arrival at any of the access units. Details of the invention will be explained with reference to FIG. 3.

Figure 3:
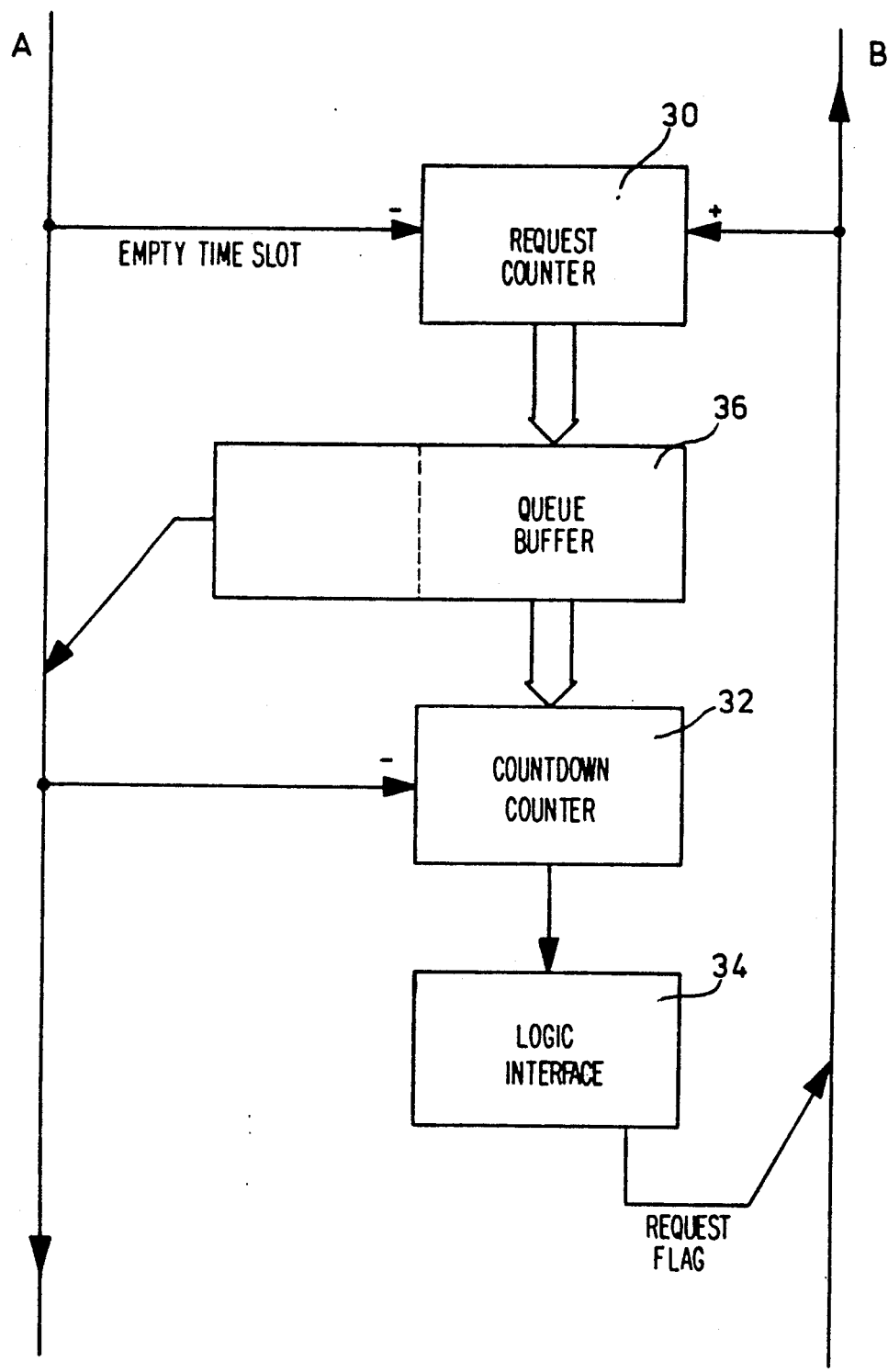
FIG. 3 illustrates an embodiment of an access unit functioning in accordance with the invention.

The system components necessary to implement the invention, as shown in FIG. 3 are partly the same as those in FIG. 2. Thus, the access unit illustrated in FIG. 3 comprises a request counter 30, a countdown counter 32 and an access unit logic interface 34. However, the access unit in FIG. 3 also includes a queue buffer 36 between the request counter 30 and the countdown counter 32. Each address of the queue buffer 36 has an increased capacity, sufficient not only to store temporarily the data packet to be transmitted but also to store in combination with each data packet a priority value as will be explained further on.

In the same way as in FIG. 2 the request counter 30 is incremented by each request flag, transmitted by downstream access units on the bus B upwards and is decremented by each empty time slot passing on bus A from the time slot generator (not shown in FIG. 3) downwards.

At the arrival in the access unit of a data packet to be transmitted, the logic interface 34 takes care that this data packet will be stored temporarily in the queue buffer 36. Together with the data packet the current value in the request counter 30 is also stored in the queue buffer 36, whereafter the logic interface 34 will reset the request counter 30 to zero. Furthermore a request flag will be generated and send upwards along bus B. This procedure is repeated for any following further datapacket to be transmitted through this access unit on bus A.

At the arrival of a data packet at the head of the queue buffer 36 the priority value which has been added to such data packet and stored in combination therewith in the queue buffer such buffer and used for preloading the countdown counter 32. From that moment on, passing empty time slots on bus A do not have any influence on the request counter 30 anymore, but are only used to decrement the countdown counter 32. As soon as the countdown counter 32 reaches the zero value a signal is provided to the logic interface 34, which in turn will initiate the transmission of the data packet at the head of the queue in buffer 36 on the bus A.

If the queue buffer 36 contains more packets to be transmitted then these packets will shift through the queue buffer, or a circular pointer is updated, and again the priority value associated with the new heading packet in the queue is used for preloading the countdown counter 32, etc.

If the queue buffer 36 does not contain any more packets to be transmitted then the passing empty time slots on bus A are used again for generating decrement signals to the request counter 30.

It will be clear that applying the method according to the invention will result in the generation of a request signal for each data packet at the time it arrives at one of the access units of the system. That implies that all data packets which are already in the queue in any of the access units have a higher priority, whereas any further data packet arriving afterwards will have a lower priority. In other words a strict first-in/firs-out regime is maintained.

The sum of the priority values which are, added in each access unit to the various data packets in the queue buffer 36 equals the total number of request flags which have been sent before the arrival of the last data packet. That means that indeed the last received data packet has to wait until all the other data packets already queued in any of the access units are transmitted. It furthermore means that by just adding the current request counter value to each of the data packets a very simple system is created for keeping track of the total number of request flags already transmitted before the arrival of any data packet in an access unit.

Figure 4:
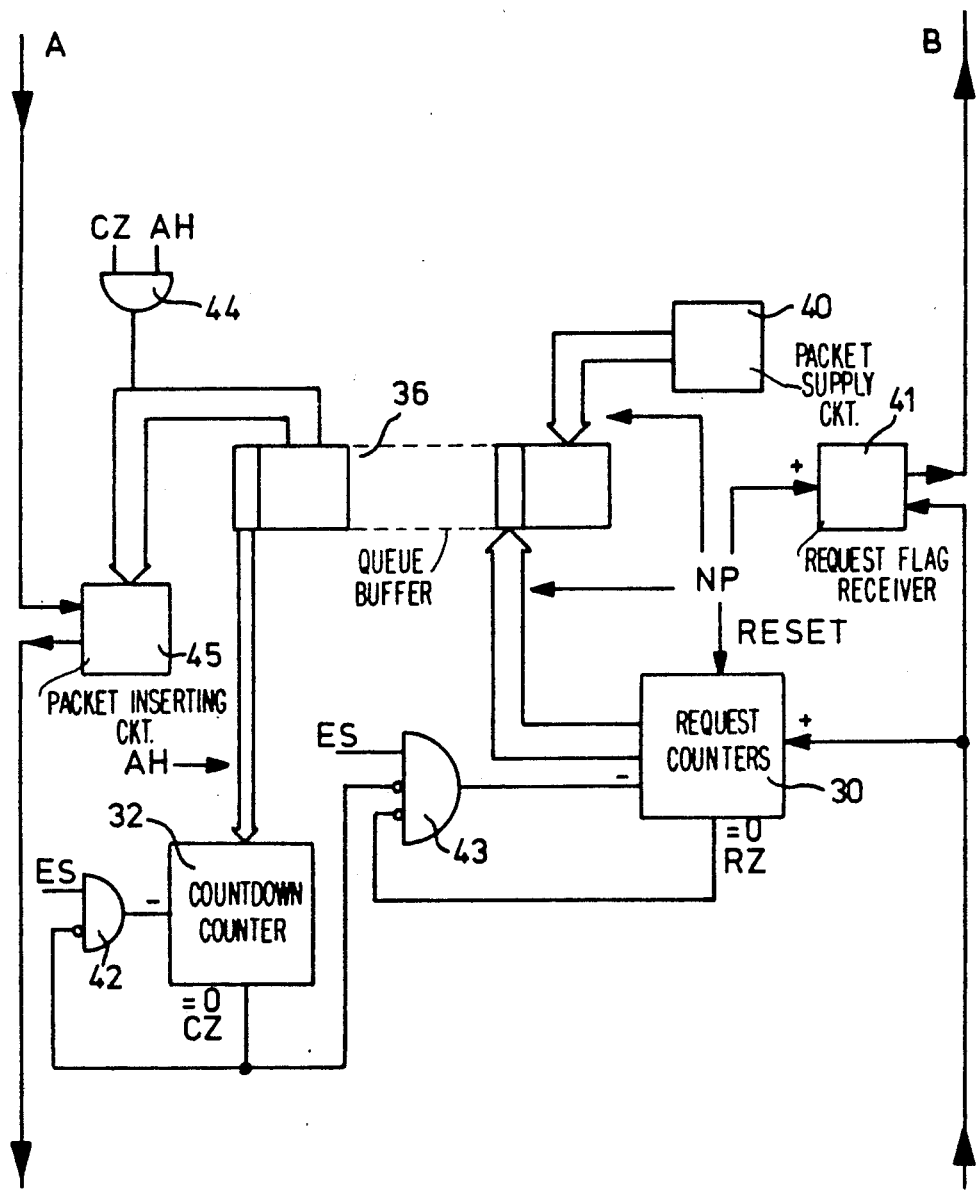
FIG. 4 illustrates a more detailed embodiment of the logic interface 34 in FIG. 3.

FIG. 4 illustrates a more detailed embodiment of the access unit logic interface 34. It consists mainly of a number of gates interconnecting the bus A, bus B, the request counter 30, the countdown counter 32 and the queue buffer 36. The signals illustrated in FIG. 4 can be specified as follows:

AH: packet at head of the queue buffer
ES: empty time slot
NP: new packet
CZ: countdown=0
RZ: request counter=0.

A new packet will be delivered to the access unit by means of the circuit 40, which is only schematically illustrated. Together with the delivery of the new packet by the circuit 40 a signal NP, indicating the arrival of a new packet, is generated and this signal NP will be used for the already mentioned various purposes. First of all the signal NP is used to store the current value of the request counter 30 in the queue buffer 36 in combination with the new data packet and thereafter for resetting the request counter 30 to 0. Furthermore the signal NP is used to increment the incoming number of request flags, received by the request flag receiver 41 from the downstream access unit on bus B by one, so that an increased number of request flags will be transmitted upwards along bus B.

The data packets in the queue buffer 36 will gradually move from the right to the left in FIG. 4 towards the head of the queue buffer. At the arrival of a data packet at the head of the queue buffer 36 a signal AH will be generated, which signal causes the request counter value, added to the data packet at the time this packet was received by the queue buffer, to be loaded in the countdown counter 32. From that moment on the countdown counter 32 will be decremented by each empty time slot passing on bus A, under the influence of the signal ES. This signal ES is generated every time an empty time slot is passing on bus A. The signal ES is supplied to the countdown counter 32 through the gate 42. The gate 42 is used to stop the decrementing process as soon as the countdown counter reaches the zero value. As soon as the countdown counter 32 reaches the zero value the countdown counter 32 generates a signal CZ which is not only supplied to the gate 42 to stop the decrementing process but also supplied two further gates 43 and 44. In gate 44 the signal CZ is combined with the already mentioned signal AH (generated at the time the respective packet reached the head of the queue buffer) leading to an output signal from the gate 44 by means of which the packet is inserted in the next empty time slot by means of the circuit 45. In gate 43 the signal CZ is combined with the signal RZ from the request counter 30, and the empty time slot signal ES, with the effect that as long as CZ is present and RZ is not present, the empty time slot signals ES are used to decrement the request counter 30. However, as long as the queue buffer contains further data packets to be transmitted, the countdown counter 32 will be reloaded directly with the value added to the next data packet to be transmitted, causing the disappearance of signal CZ, which in turn will disable gate 43 so that no decrement signals will be supplied to the request counter 30.

Although the method described with reference to FIGS. 3 and 4 is a bit more complex to implement than the prior art method illustrated in FIG. 2, by maintaining the strict FIFO-protocol the shortest maximum delay per data packet is ensured. Moreover, with this strict FIFO-protocol a burst of traffic on any input link is transmitted as a burst on the output link. On the other hand, with the prior method described with reference to FIG. 2 bursts are smoothed out by the bus sharing mechanism which will lead to more variation in delay.

To implement a strict FIFO-strategy it is preferred that the rate at which request bits are transmitted on bus upstream fulfils the following requirements:

1. The request bit transmission rate must be at least as high as the maximum possible flow of empty slots on the downstream bus A in order to exploit fully the output capacity. There is no need to select a higher request bit transmission rate since there is no point in requesting empty slots at a higher rate than the rate at which they can be generated by the time slot generator.

2. The request bit density in a communication network with n input links is dependent onto the traffic density of the (n−1) downstream input links. In other words, the request bit density is dependent onto the maximum total instantaneous data packet arrival rate. It is of course sufficient to keep the request bit transmission rate on the upstream bus B in line with the expected maximum total instantaneous data packet arrival rate of the (n−1) downstream input links.

Assuming again a communication network with 16 input links each with a bandwith of 1 gigabit/sec, and a data packet length of 100 bits, than the maximum flow of empty slots is of the order of 10 empty slots per microsecond, and the total maximum instantaneous input data packet rate is at worst 160 packets/microseconds. The maximum request bitrate needed on the upstream bus B would thus be 150 Mbit/sec at worst, if request bits are sent immediately upon arrival of the data packets in the input queues as required to maintain a strict FIFO-strategy.

The countdown counter 32 should be able to deal with decrements every 100 ns and the request bit counter 30 should be able to deal with decrements every 100 ns and with increments every 6 ns in the worst case.

Access units may have to transmit request bits on the upstream bus B at the same time. However, writing and reading on this bus must be undirectional. A first method of implementation is to use a time bit slotted structure for the upstream bus B.

Another type of access mechanism for the request bit bus B is to use packets combining a number of request bits on the bus B. With for instance 16 access units four bit-strings can be sent synchroneously upstream from the most downstream access unit in which the four bit-strings are generated. Each string would be read by every upstream access unit. If no request bit is waiting in the access unit than the bit-string is left unaltered. If a request bit is pending, the string value is incremented by one before being forwarded to the next access unit. Fairness is achieved in this method at the cost of some bandwith loss (except under heavy loads), but the maximum frequency of increments at the bit request counters is four times smaller than with the above-mentioned time bit slotted structure for the upstream bus B.

I claim:

1. A method of transmitting data packets in time slots on a communication network having first and second unidirectional buses which are oppositely directed and a plurality of access units coupled between the busses, said method including the steps of forming a distributed queue of data packets by queueing in each access unit the therein received data packets to be transmitted on the first unidirectional bus, transmitting a request flag on the second unidirectional bus by each access unit for each data packet in the queue in the respective access unit, keeping track in each access unit of all request flags passing said access unit on the second unidirectional bus, and transmitting a data packet from the queue in an access unit after a predetermined number of empty time slots has passed said access unit on the first bus; characterized in that at the time a further data packet arrives in an access unit and is added to the queue therein a request flag is transmitted on the second bus by said access unit, and said further data packet is transmitted by said access unit in the first empty time slot on the first bus after a preselected number of free slots on the first bus have passed said access unit, said preselected number of free slots being equal to the total number of data packets in the distributed queue at the time of arrival of the further data packet in said access unit; whereby only data packets which were queued in the network before arrival of said further data packet are transmitted before said further data packet, in accordance with the first-in/first-out principle.

2. A method of transmitting data packets in time slots on a communication network according to claim 1, characterized in that the total number of data packets in the distributed queue is determined by adding to said further data packet, at the time it arrives in the access unit and is added to the queue therein, a priority value equal to the number of request flags detected by said access unit since the arrival of the last data packet prior to said further data packet, the sum of all the priority values of the data packets in the queue within each access unit being equal to the total number of data packets queued in the downstream access units.

3. A method of transmitting data packets in time slots on a communication network according to claim 2, characterized in that after arrival of a data packet at the head of the queue in an access unit, said data packet is transmitted on the first bus by such access unit in the first free time slot following the passing of a number of time slots equal to the priority value added to said data packet.

4. A method of transmitting data packets in time slots on a communication network according to claim 1 characterized in that the request flags are transmitted in the form of request bits and the rate at which said request bits are transmitted on the second bus is at least as high as the maximum transmission rate of time slots on the first bus.

5. A method of transmitting data packets in time slots on a communication network according to claims 1, characterized in that the request flags are transmitted on the second bus in the form of request bit-strings, the value of which represents a number of request flags, which bit-strings are successively received by each upstream access unit along the second bus and are either retransmitted unaltered if the receiving access unit has no request flag to transmit or retransmitted after incrementation by one if the receiving access unit has a request flag to transmit.

6. A method of transmitting data packets in time slots on a communication network according to claim 5, characterized in that a priority value, represented by the value of a request bit-string received by an access unit at the time it transmits a request flag because a further data packet has been added to the queue therein, is added to said further data packet.

7. A system for transmitting data packets in time slots on a communication network having first and second unidirectional buses which are oppositely directed and a plurality of access units coupled between the buses, said system comprising in each access unit a request flag counter connected to become incremented by each request flag passing on the second bus, a countdown counter connected to become decremented from an initially loaded value to a predetermined end value by each empty time slot passing on the first bus, a queue buffer for queuing the data packets received in the access unit for transmission on the first bus, and a logic interface adapted to transmit request flags for each data packet in the queue buffer and to initiate transmission of the data packet at the head of the queue after the countdown counter reaches said predetermined end value, and to reload said countdown counter on the basis of the value accumulated in the request flag counter; characterized in that in each access unit the queue buffer is adapted to store, in combination with each data packet, priority value which is shifted therewith through said buffer; and the logic interface is adapted to transmit a request flag on the second bus at the time a further data packet arrives in the access unit, to store said further data packet in the queue buffer in combination with the then accumulated value in the request counter, such accumulated value constituting said priority value of said further data packet to reset said request counter thereafter, and to reload the countdown counter with the priority value of a data packet in the queue buffer as soon as such data packet reaches the head of the queue buffer in said access unit.

* * * * *